INVENTORS.
HAROLD V. HANCE,
ARNOLD H. GILLMER.

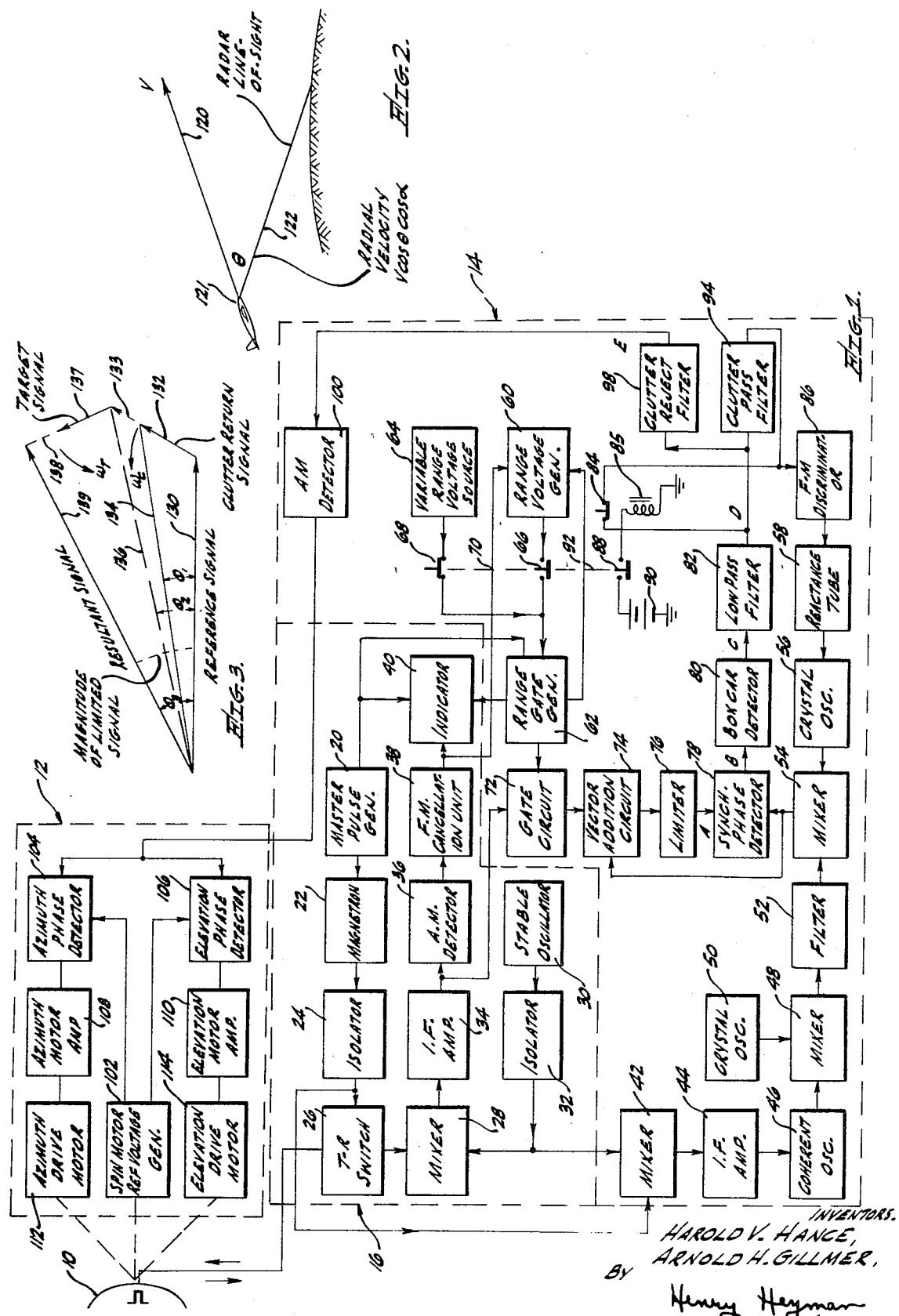

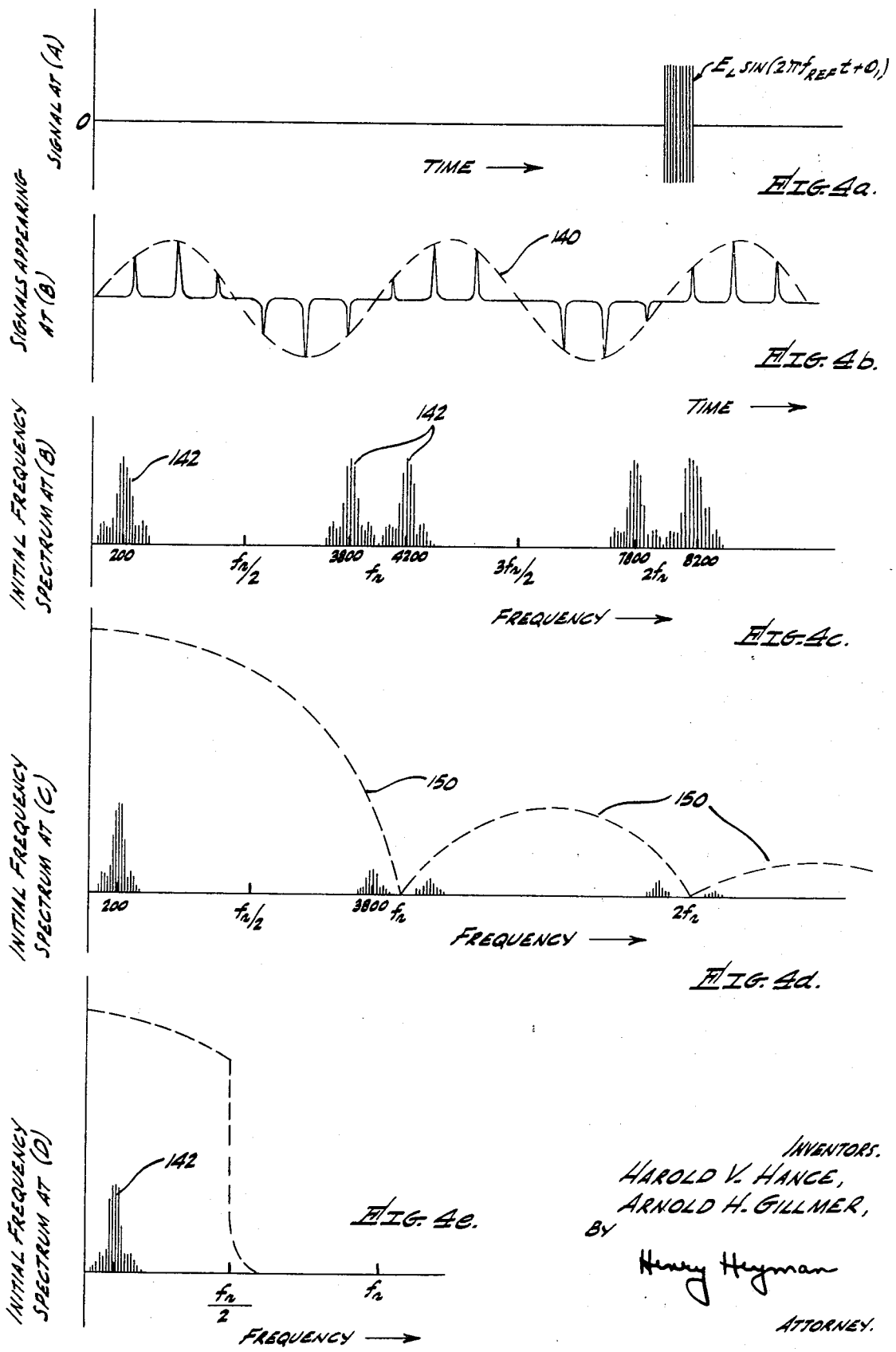

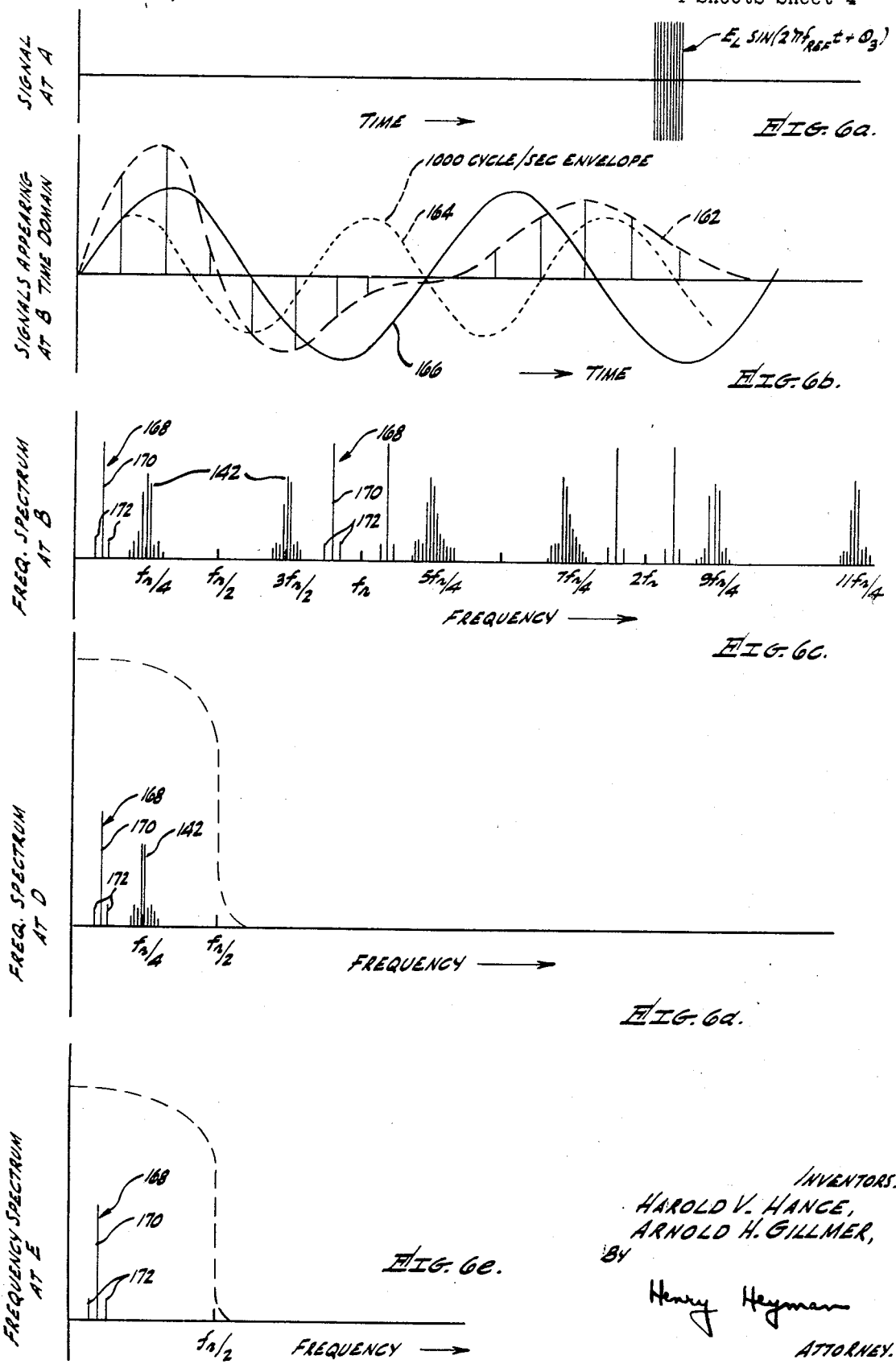

United States Patent Office 3,522,604
Patented Aug. 4, 1970

3,522,604
COHERENT-ANGLE TRACKING SYSTEM
Arnold H. Gillmer and Harold V. Hance, Los Angeles, Calif., assignors to Hughes Aircraft Company, Culver City, Calif., a corporation of Delaware
Filed Dec. 9, 1955, Ser. No. 552,232
Int. Cl. G01s 9/14, 9/42
U.S. Cl. 343—7.3                                8 Claims This invention relates to moving-target radar apparatus and more particularly to a coherent radar system capable of angle tracking a moving target from a moving platform wherein the return echoes from the target appear amidst signals returned from the ground in the vicinity of the target generally referred to as "clutter."

When a beam of electromagnetic energy is incident on a moving target, it is generally known that the energy reflected from the target will undergo a shift in frequency. The extent of this shift in the frequency of the reflected energy is proportional to the radial velocity of the target relative to the source from which the beam originally emanated. This shift in frequency due to the radial movement of the target with respect to the source is known as the "Doppler" shift. Thus, if energy having a frequency equal to that of the transmitted beam is mixed with the energy reflected from the target and received at the source, a signal having a component with a frequency equal to the Doppler shift would result. In a pulsed radar system, however, the duration of the pulses is only a small fraction of each alternation or half-cycle of the signal at the Doppler shift frequency. It is therefore evident that the resulting signal produced by mixing transmitted and received energy reflected from a moving target in a pulsed radar system results in a series of pulses of an amplitude which will vary in accordance with the instantaneous phase of a signal of the Doppler shift frequency. This phenomenon has been employed in "moving-target-indication" (MTI) search radar systems to distinguish a target echo amidst ground return from the vicinity of the target. For single tracking purposes, however, the amplitude modulations of the signal reflected from the target resulting from the conical scanning of the antenna are also present on the clutter return signal which causes the system to track a point intermediate the target and the ground rather than the target. For this reason, present day MTI radar systems have heretofore not been used for angle tracking purposes.

The device of the present invention provides apparatus for deriving an error signal from target echo signals provided by either a coherent or noncoherent MTI radar system, a system being coherent when oscillations from a stable oscillator are used as a reference and noncoherent when the frequency of ground return is used as a reference. This is accomplished in two phases of operation. First, the clutter return signal received from the vicinity of the target in response to each exploratory pulse, i.e. a range element from the vicinity of the target, is obtained by means of range gating apparatus. Assuming the radar system to be mounted on an aircraft, the clutter return signal will undergo a Doppler shift in frequency due to the velocity of the aircraft and also, over a series of samples, will be amplitude modulated at the spin frequency employed to conically scan the antenna of the radar system.

In accordance with the invention, the amplitude modulations of the clutter return signal are first converted to phase deviations of a resultant signal from a reference signal. The resultant signal is then phase detected with the reference signal to produce a series of pulses having amplitudes indicative of the instantaneous phase of a Doppler component and which vary in amplitude in accordance with the spin frequency of the antenna. The composite spectral distribution of this series of pulses comprises a series of individual spectral distributions of Doppler components which have symmetry about frequencies equal to odd multiples of one-half the pulse-repetition rate or frequency of the radar system and are periodic at integral multiples of the pulse-repetition frequency. The envelope of the composite spectral distribution will depend on the pulse shape and will have nulls at the reciprocal of the pulse width and multiples thereof. Due to noise on the clutter return signal, its corresponding individual spectral distribution within each of the above intervals is "smeared" over approximately 100 cycles. As the aircraft accelerates or decelerates slightly, however, the spectral distributions will shift their position in the frequency spectrum. In order to reject this "noise," the components constituting the spectral distribution of the clutter return signal occurring within one of the intervals are selected by means of a filter and impressed on a frequency discriminator to produce an output voltage which is used to shift the frequency of the reference signal in a manner to maintain the smear of components constituting the spectral distribution of the clutter return signal within the selected interval centered at a multiple of one-fourth the pulse-repetition frequency. A band-pass filter is then inserted ahead of the frequency discriminator so that it will not subsequently be affected by the appearance of components of target echo signals.

During the second phase of operation, the range gate is moved so that the range element includes echo signals from the target being tracked. Thus, the received signal in this phase of operation includes target echo as well as clutter return signals, both of which may have a Doppler shift in frequency and amplitude modulations at the spin frequency of the antenna. The amplitude modulations of the target echo and clutter return signals are therefore converted to composite phase deviations of the resultant signal from the reference signal. Also, the composite spectral distribution of the target echo signal has components that are symmetrically disposed about each frequency equal to odd multiples of one-half the pulse-repetition frequency and which are periodic at integral multiples of the pulse-repetition frequency in a manner similar to the clutter return signal. So long as the radial velocity between the target and the aircraft is different from that between the aircraft and the ground in the vicinity of the target, the individual spectral distributions of the components of the clutter return and target echo signals will appear at different frequencies within the range selected by the filter. Therefore, inasmuch as the spectral distribution of the components of the clutter return signal is maintained centered at a quarter point of the pulse-repetition frequency, the components of the clutter return signal may be rejected by means of a suitable filter and the remaining components of the target echo signal amplitude modulation detected to produce the error signal for maintaining the antenna directed towards the target. It is to be noted that although the device of the present invention is explained in conjunction with a tracking system employing a conically scanning antenna, the teachings may be applied to mono-pulse tracking systems.

It is therefore an object of the present invention to provide an apparatus for incorporation into an MTI radar system capable of tracking a moving target, the return echo signals of which appear amidst a clutter return signal.

Another object of the invention is to provide an apparatus for separating target echo signals from clutter return signals in a manner to enable an error signal for tracking the target to be derived from said echo signals.

Still another object of the invention is to provide apparatus for maintaining the individual spectral distributions of the frequency components of the clutter return signal within predetermined portions of the frequency spectrum thereby to enable the clutter return signal to be rejected.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 1 is a schematic block diagram of a noncoherent search MTI radar system which incorporates the device of the present invention;

FIG. 2 is a diagram illustrating the extent of the shift in frequency of the ground return signal brought about by the Doppler effect;

FIG. 3 is a vector diagram illustrating the vector addition of a reference voltage to the composite clutter and target signals;

FIGS. 4a to 4e illustrate characteristics of the signal potentials at several stages in the device of FIG. 1 when only a clutter return signal is received;

FIGS. 6a to 6e illustrate the signal potentials of FIGS. 5a to 5d in the presence of a target echo signal.

Figure 5A:
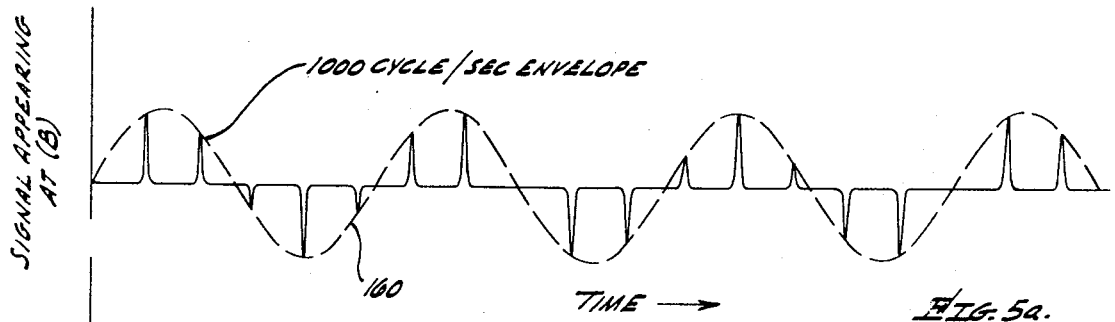
FIGS. 5a to 5d illustrate waves to show the effect of the device of FIG. 1 on the frequencies and location of the spectral distributions of the components of the signal potentials illustrated in FIGS. 4a to 4e.

Referring now to FIG. 1, there is shown a block diagram of the coherent-angle tracking device of the present invention as it would be used with a noncoherent MTI search radar. This system comprises an antenna 10 which is adapted to conically scan, an antenna positioning and scanning apparatus 12 which is responsive to an error signal developed by a coherent Doppler angle tracking unit 14 which in turn receives input signals from a modified noncoherent search radar 16. The search radar 16, insofar as the invention is concerned, may be either coherent or noncoherent. Also, the fact that the operation of the coherent-angle tracking unit 14 of the present invention is described in conjunction with a noncoherent radar in the present case, is for the purposes of illustration and is not to be construed as a limitation on the scope of its applications. In order to operate with the coherent-angle tracking device 14, it is necessary to modify a noncoherent search radar to the extent that the stability of certain of its operating frequencies is substantially increased over that normally required for conventional noncoherent radar systems. Accordingly, the search radar 16 comprises a master pulse generator 20 for producing pulses which may, for example, have a duration of one-quarter microsecond and a pulse-repetition frequency of 4000 cycles per second. These pulses are employed to energize a magnetron 22 which is preferably of the untunable type. In the present case, a tuning range of from 9280 to 9380 megacycles per second is satisfactory. The output of the magnetron 22 is fed through an isolator 24 and is diverted by a TR switch 26 to the antenna 10 where it is radiated as a beam of electro-magnetic energy thereby to provide an "exploratory" pulse. The isolator 24 serves to isolate the magnetron 22 from changes in impedance of the output circuit due to the conical scan of the antenna 10 and other causes.

In addition to the above, the TR switch 26 diverts signals received by the antenna 10 in response to the exploratory pulse to the receiving channel of the radar 16 which commences with a mixer 28. The local oscillations of the receiving channel are provided by a stable oscillator 30, which is tunable from 9250 to 9350 megacycles per second, consistent with the tuning range of magnetron 22. Also, in order to achieve the increased stability requirements for operation with the device of the present invention, it is necessary that the oscillator 30 be stable to one part in $10^8$. In order to aid in maintaining this degree of stability, the output from oscillator 30 is fed through an isolator 32 to the mixer 28 to eliminate changes in its load impedance. The output from the mixer 28 contains components which are of a frequency equal to the difference in frequency between the output signal from the stable oscillator 30 and the signals received in response to the exploratory pulses. These components are amplified by an IF (intermediate-frequency) amplifier 34 and impressed on an AM (amplitude-modulation) detector 36 to produce a signal wherein successive target indications of different amplitude are produced by the beat between the target echo and clutter return signals due to their being shifted in frequency by different amounts by the Doppler effect. Successive sweeps of this signal from the AM detector are then cancelled by an FM (frequency-modulation) cancellation unit 38 which may be of the type described in a copending application for patent, Ser. No. 327,558, entitled "Moving Target Selector," filed by Harold V. Hance and Norman H. Enenstein on Dec. 23, 1952, now U.S. Pat. No. 3,026,514, and assigned to the same assignee as the present application. The output from the FM cancellation unit 38 together with synchronizing pulses from master pulse generator 20 are applied to an indicator 40 to provide a visual display.

The coherent Doppler angle tracking unit 14 employs signals provided by the noncoherent radar 16 to produce an error signal which is, in turn, employed by the antenna positioning and scanning unit 12 is directing the antenna 10 towards the target being tracked. More particularly, the tracking unit 14 comprises a linear mixer 42 which is responsive to output signals from both the magnetron 22 and the stable oscillator 30. Accordingly, a low power output signal from the magnetron 22 is provided for the mixer 42 by a connection from between the isolator 24 and the TR switch 26 to the mixer 42, and an output signal from the stable oscillator 30 is provided by means of a connection from the output of isolator 32 to the mixer 42. The mixer 42 is adapted to develop frequency components located at the difference in frequency between the outputs from magnetron 22 and the stable oscillator 30. Thus, the output from mixer 42 is a periodic signal having a duration equal to that of the pulses employed to energize the magnetron 22 and a frequency equal to the intermediate frequency in the radar system. The output from mixer 42 is amplified by an IF amplifier 44 and impressed on a coherent oscillator 46 where it constitutes an IF locking pulse. Thus, even though the noncoherent transmitter of the MTI radar 16 is randomly phased, the coherent oscillator 46 is phase locked to the frequency of each transmitted pulse of this randomly phased transmitter so as to be capable of providing coherent video signals.

The output from the coherent oscillator 46 is in turn impressed on a mixer 48 along with a 10 megacycle signal provided by a crystal oscillator 50, thereby to shift the frequency of the output signal from the coherent oscillator by 10 megacycles. The output from mixer 48 is then fed through a filter 52 to select the desired frequency components and then impressed on an additional mixer 54. The mixer 54 mixes the signal received through filter 52 with a signal provided by a crystal oscillator 56 which has a mean frequency of oscillation of 10 megacycles and is adapted to have its frequency shifted by a reactance tube 58. Mixer 54 provides a reference signal that has a frequency, $f_{REF}$, substantially equal to the intermediate frequency of the radar 16, as determined by the frequency, $f_{COH}$, of the coherent oscillator 46, plus the deviation in frequency, $\Delta f_{COH}$ (which may be plus or minus) produced by the reactance tube 58 of the crystal oscillator 56. That is, $$f_{REF} = f_{COH} + \Delta f_{COH} \tag{1}$$

In addition to the signals provided by the magnetron 22 and the stable oscillator 30, the coherent Doppler angle tracking unit 14 is also responsive to the output signals from the IF amplifier 34, the FM cancellation unit 38 and to synchronizing pulses from the master pulse generator 20. More particularly, the tracking unit 14 includes a range voltage generator 60 which is responsive to the target indications appearing at the output of FM cancellation unit 38 and to a range gate potential produced by a range gate generator 62 for developing a voltage representative of the range of a target being tracked. The range gate generator 62 is responsive to the synchronizing pulses produced by master pulse generator 20 and to either the range voltage produced by range voltage generator 60 or a manually adjustable range voltage provided by a variable range voltage source 64. The range gate generator 62 produces the above range gate potential which is delayed by an interval of time equal to that represented by the range voltage subsequent to each pulse produced by master pulse generator 20. The range voltage applied to range gate generator 62 may, of course, be either the range voltage automatically produced by range voltage generator 60 or the manually selected range voltage provided by the variable range voltage source 64. Accordingly, range voltage generator 60 and variable range voltage source 64 are connected to the range gate generator 62 through switches 66 and 68, respectively. The switches 66, 68 are interlocked by means of a mechanical linkage 70 in such a manner that only one of the outputs from either the range voltage generator 60 or the variable range voltage source 64 may be impressed on range gate generator 62. The position of the switches 66, 68 is shown for the first phase of operation of the device. The range gate potentials thus produced by range gate generator 62 are impressed, in turn, on the range voltage generator 60 where they are used in automatically generating the range voltage; on the indicator 40 in order to provide a visual indication of the position of the range gate; and on a gate circuit 72 which is coupled to the output of the IF amplifier 34.

The range gate potentials produced by the range voltage generator 62 is impressed on the gate circuit 72 to pass the selected range element of the signal received by the radar 16 in response to an exploratory pulse. The actual range at which this element is taken is controlled by the range voltage from either the variable range voltage source 64 or the range voltage generator 60, depending upon the position of the switches 66, 68, i.e., whichever unit is connected to the range gate generator 62. The output from gate circuit 72 along with the reference signal provided by the mixer 54 is impressed on a vector addition circuit 74 to add the reference signal appearing at the output of mixer 54 vectorially to the signal within the selected range element appearing at the output of gate circuit 72, thereby to convert amplitude variations due to conical scanning and noise and phase modulations due to Doppler effects into phase deviations of the resultant signal from the reference signal in a manner hereinafter described. The composite resultant signal appearing at the output of vector addition circuit 74 is then limited by means of a limiter 76 and impressed on a synchronous phase detector 78 along with the reference signal to convert the phase deviations therebetween into a video signal which constitutes a series of pulses of amplitudes proportional to the instantaneous phase deviation. In the event that it is desired to use the frequency components of this video signal within the interval of frequencies from zero to one-half the pulse-repetition frequency, $f_r$, the power may be increased by "boxcaring" with a boxcar detector 80, i.e., a detector which ideally stretches each pulse until the next pulse is received. Also, in that the output of the boxcar detector 80 does not change between successive pulses, it is evident that gating could be accomplished by controlling the instant of sampling by the boxcar detector 80, if desired. The output signals from the boxcar detector 80, however, are identical irrespective of where the gating is accomplished. The output signal from the boxcar detector 80 is then impressed on the input of a low-pass filter 82 which has a cut-off frequency, equal to $f_r/2$, where $f_r$ is the pulse-repetition frequency. Signals appearing at the output of the low-pass filter 82 are connected through switch contacts 84 of a solenoid relay 85 to an FM discriminator 86 which is tuned to produce a null output signal at one-fourth the pulse-repetition frequency, i.e., at $f_r/4$. The coil of relay 85 is connected from ground through an additional switch 88 to a battery 90 which is referenced to ground to provide a means of energizing the solenoid relay 85. The switch 88 is interlocked with the switches 66, 68 by means of an additional mechanical linkage 92 in such a manner that the switch contacts 84 remain closed during the first phase of operation, as shown in the drawing.

Connected in shunt with the switch contacts 84 of the solenoid relay 85 is a clutter pass filter 94. This clutter pass filter 94 will, as is evident from the drawing, be shorted through the switch contacts 84 during the first phase of operation. During the second phase of operation, however, the circuit through the switch contacts 84 will be opened thereby inserting the clutter pass filter 94 between the low-pass filter 82 and the FM discriminator 86. The purpose of the clutter pass filter 94 is to prevent target echo signals from being impressed on the FM discriminator 86 during the second phase of operation which would result in an erroneous output from the discriminator 86. This output would, in turn, be impressed on the reactance tube 58 to cause an erroneous shift in the frequency of the reference signal. As will be hereinafter explained in more detail, the frequency of the reference signal is continuously shifted by the operation of the reactance tube 58 in response to the output from the FM discriminator 86 so that the selected spectral distribution of components of the clutter return signal remain centered about $f_r/4$. Accordingly, the clutter pass filter 94 is of the band-pass type with a pass band of approximately 100 cycles centered about $f_r/4$.

A clutter reject filter 98 having an elimination band coextensive with the pass band of clutter pass filter 94, i.e., an elimination band of approximately 100 cycles centered about $f_r/4$, is connected to the output of low-pass filter 82 to isolate the spectral distribution of frequency components of the target echo signal from those of the clutter return signal. An AM detector 100 is then connected from the output of clutter reject filter 98 to the antenna positioning unit 12 to detect amplitude modulation of the frequency components of the target echo signal within the selected interval of frequencies to provide the error signal for tracking the target.

The antenna positioning and scanning unit 12 may be of the type which comprises, for example, a spin motor and attached azimuth and elevation reference voltage generator 102 for providing conical scan of the antenna 10; azimuth and elevation phase detectors 104 and 106, respectively, each of which is responsive to the error signal from AM detector 100 and the respective azimuth or elevation reference voltage provided by generator 102 for producing direct-current azimuth and elevation error signals; azimuth and elevation motor amplifiers 108, 110 for amplifying the azimuth and elevation error signals for driving azimuth and elevation drive motors 112, 114, respectively, for positioning the antenna 10.

In explaining the operation of the device of the present invention, it will first be assumed that a target has been detected during a search phase of operation of the non-coherent radar 16 and that the first step in accomplishing "lock-on" has been accomplished. In the first step, the mean direction of the conically scanning antenna 10 is manually directed in the usual manner towards the selected target. Lock-on is the term which designates the completion of the procedure for setting the controls of the radar system so that it will continue to track the target. Also, in the following description representative values of the parameters used in the system are given for the purpose of illustration only and are not intended to limit the scope of the invention.

Accordingly, the master pulse generator 20 produces a series of synchronizing pulses at a pulse-repetition frequency, $f_r$, of 4000 cycles per second and of approximately one-quarter microsecond duration. These synchronizing pulses are amplified and impressed on the magnetron 22, the output signal of which is diverted by the TR switch 26 to the antenna 10 where exploratory pulses are radiated as beams of electromagnetic energy. For the purposes of explaining the operation of the present device, the portion of the received signal resulting from energy reflected from a target in response to exploratory pulses is designated as a target echo signal and the portion of the receive signal resulting from energy reflected from objects other than the target as a clutter or ground return signal. In general, the target echo and clutter return signals are received simultaneously. Under certain circumstances, when the target is an aircraft flying close to the ground, for example, the clutter return signal may be of sufficient amplitude to practically obliterate the target echo signal. In that it is under these conditions that the device of the present invention is designed to operate, it is assumed that target echo and clutter return signals having comparative magnitudes as above, are received in response to the exploratory pulses. Accordingly, use is made of the Doppler shift in frequency that each signal has undergone to separate one from the other. As is generally known, the extent of the Doppler shift in frequency at the aircraft on which the system is mounted is equal to twice the radial velocity between the aircraft and the reflecting surface divided by the free space wavelength λ at the frequency of operation. In this respect, the Doppler shift in frequency of the clutter return signal varies with the direction in which the antenna 10 is directed and with the velocity of the aircraft. Referring to FIG. 2, if the aircraft 121 is proceeding at a velocity, V, represented by the vector 120, when the radar line-of-sight 122 from the antenna 10 has elevation and azimuth angles relative to the vector 120 of $\theta$ and $\alpha$ degrees, respectively, radial velocity between the earth and the aircraft along the radar line-of-sight 122 is $V \cos \theta \cos \alpha$ which velocity corresponds to a Doppler shift of $$\frac{2V \cos \theta \cos \alpha}{\lambda}$$

cycles per second. It is thus apparent that the Doppler shift in frequency not only varies with the velocity of the aircraft, but also with the azimuth and elevation angle of the antenna 10, as well. In addition to the Doppler shift, corresponding range elements of the clutter return signal over successive sweeps of the radar are amplitude modulated at the spin frequency of the antenna 10 due to the conical scan.

The noncoherent radar 16 operates in a conventional manner. That is, the target echo and clutter return signals received by the antenna 10 are diverted by the TR switch 26 to the mixer 28 where they are mixed with the output signal from the stable oscillator 30. The frequency components of the signal appearing at the output of mixer 28 which are equal to the difference of the frequencies of the input signals are amplified by the IF amplifier 34 and then detected by the AM detector 36 and successive sweeps cancelled by the FM cancellation unit 38 in the manner previously described.

During the first phase of operation of the present device, the switches 66, 68 and 88 are depressed to the position shown in FIG. 1 of the drawings and the output voltage provided by the variable range voltage source 64 is adjusted to a value which places the range gate voltage produced by the range gate generator 62 so as to select a range element in the vicinity of, but not including the target, as may be determined from the indicator 40. The range gate voltage thus produced is also employed to open the gate circuit 72 to allow the intermediate-frequency signal appearing at the output of the IF amplifier 34 within the selected range element to pass through to the input of the vector addition circuit 74 where it is added vectorially to the reference signal appearing at the output of the mixer 54.

The result desired to be obtained from adding the clutter return signal vectorially to the reference signal is to produce a resultant signal of a frequency equal to that of the reference signal and having a phase deviation therefrom proportional to the component of the clutter return signal in quadrature therewith. In order that the phase deviations of the resultant signal be linearly proportional to the quadrature component of clutter return signal, the comparative amplitude of the reference signal should be sufficiently great so that the maximum phase deviation does not exceed 10 degrees, and in no event more than 30 degrees. The aforementioned vector addition is schematically represented in FIG. 3. Referring to this figure, a vector 130 represents the magnitude and phase of the reference signal and a vector 132 the magnitude and relative phase of the clutter return signal. The extension of vector 132 indicated by the dashed portion 133 represents changes in its magnitude due to amplitude variations. Also, over successive sweeps it is evident that the vector 132 will rotate about the vector 130 at an angular velocity, $\omega_c$, equal to $2\pi$ times the difference in frequency between the reference and the clutter return signals. That is, $$\omega_c = 2\pi[f_{REF} - (f_{COH} + \Delta f_{D(C)})] \quad (2)$$

wherein $\Delta f_{D(C)}$ is the Doppler shift in the frequency of the clutter return signal due to the velocity of the aircraft which may, of course, be either positive or negative.

Substituting Equation 1 in Equation 2:

$$\begin{aligned}\omega_c &= 2\pi[(f_{COH} + \Delta f_{COH}) - (f_{COH} + \Delta f_{D(C)})] \\ &= 2\pi(\Delta f_{COH} - \Delta f_{D(C)})\end{aligned} \quad (3)$$

The resultant signal obtained by vectorially adding the vectors 132 representative of the clutter return signal to the vector 130 representative of the reference signal is indicated by the vector 134 which has a phase deviation of $\phi_1$, degrees from the reference signal. An increase in the amplitude of the clutter return signal represented by the extension 133 to the vector 132, however, shifts the vector 134 to the position indicated by dashed line 136 at which position the resultant signal has a phase deviation of $\phi_2$ degrees with respect to the reference signal. The resultant signal is then limited by the limiter 76 and impressed on the synchronous phase detector 78 along with the reference signal. A time variation of this resultant signal appearing at the output of limiter 76 (A in FIG. 1) for one sweep of the radar 16 is shown in FIG. 4a. The signal exists only during the range element selected and would essentially be a signal of a frequency, $f_{REF}$, that differs $\phi_1$, degrees in phase from the reference signal, the magnitude of $\phi_1$, being dependent upon the amplitude and relative phase of the clutter return signal. For example, if the reference signal is represented as $E \sin (2\pi f_{REF} t)$, and since $\phi_1$ remains substantially constant during a range of element interval, it is apparent that the limited resultant signal during the interval could be represented as $E_L \sin (2\pi f_{REF} t + \phi_1)$, where $E_L$ is the peak amplitude to which the signal is limited.

Assuming the deviations in phase to be small, the synchronous phase detector 78 produces an output voltage that is linearly proportional to the component of the clutter return signal in quadrature with the reference signal. Thus, the output signal from the synchronous phase detector 78 appearing at (B) in FIG. 1 is a series of pulses concurrent in time with the range elements and hence at the pulse-repetition frequency, $f_r$, which have an envelope as indicated by the dashed line 140 in FIG. 4b that represents a signal of a frequency $$f_x = nf_r \pm \frac{\omega_c}{2\pi}$$

$n = \pm 0, 1, 2, 3, \ldots$ where $f_x$ falls within the interval of frequencies which, in the present case, is selected by the low-pass filter 82. In addition to the above, the signal represented by the dashed line 140 is amplitude modulated in accordance with the spin frequency of the antenna 10 and noise as represented by the extension 133 of vector 132. The effect of the spin frequency of the antenna 10 which may, for example, be as low as 33 cycles per second, is not apparent in FIG. 4b as it would normally not make a noticeable difference over the few cycles illustrated.

As is generally known, the composite spectral distribution of a series of pulses such as that appearing at the output (B) of the synchronous phase detector 78 and illustrated in FIG. 4b comprises separate spectral distributions 142 shown in FIG. 4c and centered about frequencies $$f_x = nf_r \pm \frac{\omega_c}{2\pi}$$

$n = \pm 0, 1, 2, 3 \ldots$ and which are periodic at the pulse-repetition frequency $f_r$ and are located symmetrically about the mid-frequencies of intervals between two successive frequencies of $nf_r$, $n = 0, 1, 2, 3 \ldots$. Also, the overall envelope of the spectral distributions 142 (which is not apparent from the figure) has null points which occur at integral multiples of the reciprocal of the pulse width. As the duration of the range element employed above is of the order of one microsecond, the first null would occur at approximately one megacycle. In the present case if it is assumed that the fundamental component of the signal represented by the envelope of the series of pulses appearing at the output (B) of the synchronous phase detector 78 has a frequency of, for example, 200 cycles per second, the center point of the spectral distribution 142 would be located at frequencies 200 cycles distant from each integral multiple from the pulse-repetition frequency, $f_r$. Thus, if $f_r$ is 4000 cycles, the spectral distributions 142 would be centered at 200, 3800, 4200, 7800, 8200 cycles per second, etc. Inasmuch as the clutter return signal is somewhat noisy, the spectral distributions 142 are smeared over approximately 100 cycles. Each spectral distribution 142 will have a maximum at its center frequency as defined above, and in addition will have sub-maximum spaced at intervals equal to the spin frequency of antenna 10 on each side of the center frequency component.

The output from the synchronous phase detector 78, i.e., the signal appearing at (B), is next impressed on the boxcar detector 80 which converts the series of pulses into a signal which constitutes a voltage which successively changes to the amplitude of each pulse. This signal is then, in effect, a series of pulses having a pulse-repetition frequency $f_r$ and a pulse width or duration $$\tau = \frac{1}{f}$$

Thus, the null frequencies of the envelope of the composite spectral distribution of this series of pulses, represented by dashed line 150 in FIG. 4d, occur at integral multiples of $1/\tau$ cycles per second which is equal to $f_r$, the pulse-repetition frequency. Also, the maximum amplitude of the envelope 150 intermediate the null frequencies is one-third that of the previous maximum. Hence, it is evident that all frequencies greater than the pulse-repetition frequency $f_r$ are attenuated. The main purpose of the boxcar detector 80, however, is to increase the power of the signal in the components of the spectral distribution occurring below $f_r/2$ cycles per second. The output of the boxcar detector 80 is then passed through the low-pass filter 82 which has a cut-off frequency $f_r/2$ cycles per second so that only the spectral distribution of frequency components that were located between zero and $f_2/2$ remain, as shown in FIG. 4e.

Figure 5B:
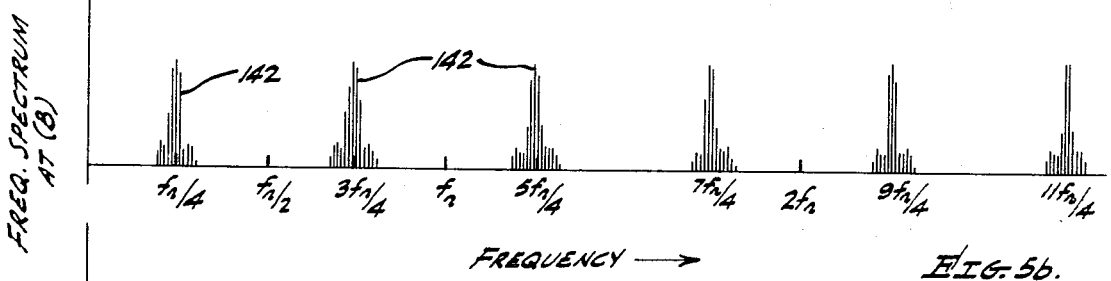
Figure 5C:
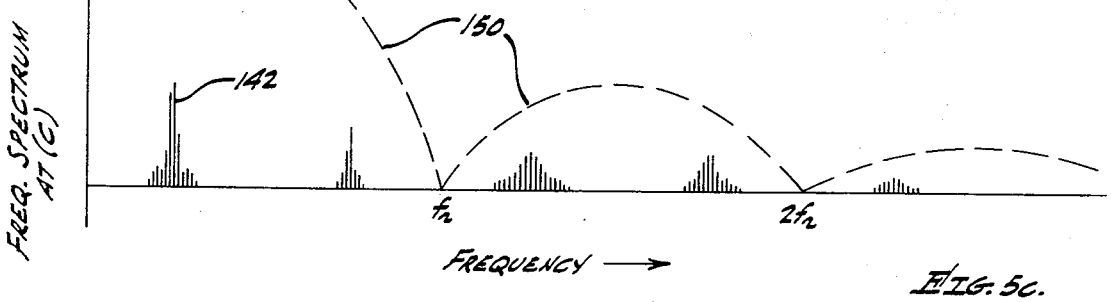
Figure 5D:
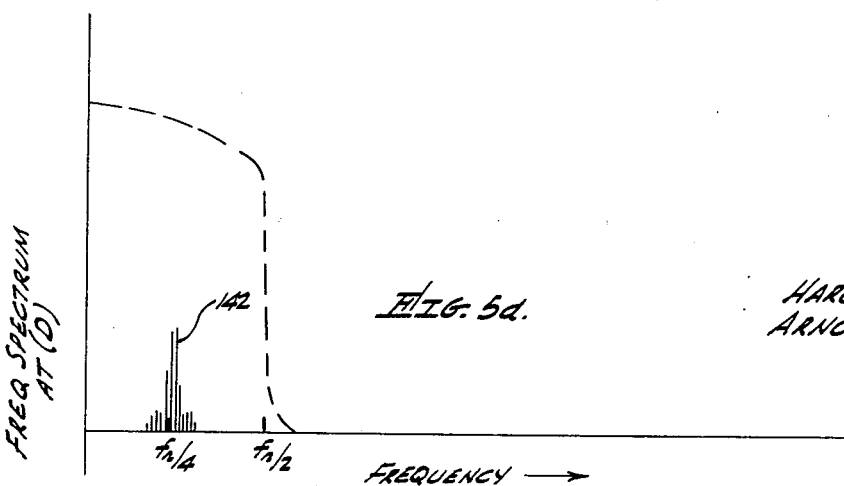

The remaining spectral distribution of components is then impressed through the switch 84 onto the FM discriminator 86 which is tuned to produce a null output at $f_r/4$ cycles per second. The FM discriminator 86, in response to the remaining spectral distribution of components, produces an output potential which is applied to the reactance tube 58 which changes the increment of frequency, $\Delta f_{COH}$, by which the frequency $f_{COH}$ from the coherent oscillator 46 is shifted in producing the signal. A change in the frequency of the reference signal, that is a different value of $\Delta f_{COH}$, results in the changing of the frequency of the signal represented by an envelope 160 in FIG. 5a of the series of pulses now appearing at the output (B) of the synchronous phase detector 78. There are two possibilities which it is necessary to consider; first, if this frequency increases, it is evident that the remaining spectral distribution will be shifted towards $f_r/4$ at which frequency the output from the FM discriminator 86 will be zero whereby no additional shift in frequency is produced by the reactance tube 58. Under these circumstances, the FM discriminator 86 produces an output that maintains the remaining spectral distribution centered about $f_r/4$. The other possibility, however, is that the shift in frequency of the reference signal will cause the remaining spectral distribution to shift in a direction away from the null frequency $f_r/4$ of the FM discriminator 86. In this event, an additional spectral distribution will enter the zero to $f_r/2$ range of frequencies from the opposite side. This latter spectral distribution will necessarily be shifted towards and be maintained centered about the null frequency of the FM discriminator 86 as before. In the present case, the centering of the remaining spectral distribution about $f_r/4$ cycles per second changes the frequency of the signal represented by the envelope 160 of the series of pulses appearing at the output (B) of the phase detector 78 to 1000 cycles per second. Accordingly, during the first phase of operation the individual spectral distributions 142 in the composite spectral distributions of the signals appearing at B, C and D, are shifted and maintained so that the center frequency components occur at odd multiples of $f_r/4$, as shown in FIGS. 5b, 5c, and 5d, respectively. The first phase of operation is now terminated by releasing the switches 66, 68, 88.

During the second phase of operation, the output voltage from the range voltage generator 60 is connected to the range gate generator 62 through the switch 66 so that the selected range element allowed to pass through gate circuit 72 now includes the target echo signal. Also, the closing of switch 88 connects the battery 90 to the solenoid relay 85 thereby opening the switch contacts 84. The opening of the switch contacts 84 opens the connection between low-pass filter 82 and the FM discriminator 86, thus interposing the clutter pass filter 94 therebetween.

As the pass band of the clutter pass filter 94 is coextensive with the components of the remaining spectral distribution 142 shown in FIG. 5d, it will not interfere with the operation of the FM discriminator 86 in maintaining spectral distribution centered at $f_r/4$. When the target echo signal is received, however, that clutter pass filter 94 will prevent frequency components from this signal from reaching the discriminator 86 and producing an erroneous shift in the frequency of the reference signal.

In the second phase of operation, the target echo signal is received simultaneously with the clutter return signal. Thus, the target echo and clutter return signals are both impressed on the vector addition circuit 74 along with the reference signal. The vector addition circuit 74 now produces a resultant signal which has a phase deviation $\phi_3$ from the reference signal which is substantially proportional to the algebraic sum of the components of the clutter return and target echo signals in quadrature with the reference signal as shown schematically in FIG. 3. Referring to this figure, a vector 137 with an extension evidenced by the dashed line 138 represents the target echo signal with its associated amplitude modulations. The resultant signal, which represents the vector sum of the reference signal, the clutter return signal and the target echo signal, is now represented by the vector 139 which has the phase angle $\phi_3$ relative to the reference signal. In this diagram the vector 137 would have an angular velocity $\omega_T$ about the reference signal where $\omega_T = 2\pi(\Delta f_{COH} - \Delta f_{D(T)})$ wherein $\Delta f_{D(T)}$ is the Doppler shift in frequency of the target echo signal due to the radial velocity of the target with respect to the aircraft. The output signal from the vector addition circuit 74 is limited as before and applied to the synchronous phase detector 78 along with the reference signal. The signal appearing at the output of the limiter 76 for one sweep of the radar 16 is shown in FIG. 6a. This signal is essentially the same as before except that the phase deviation, $\phi_3$, is now a composite deviation produced by both the clutter return and target echo signals. Accordingly, if as before, the reference signal is represented by $E \sin(2\pi f_{REF} t)$, the signal appearing at the output of the limiter 76 could be represented as $E_L \sin(2\pi f_{REF} t + \phi_3)$.

The output signal produced by the synchronous phase detector 78 in the second phase of operation will thus constitute a series of pulses which would have amplitudes equal to the algebraic sum in the components of the clutter return and target echo signals in quadrature with the reference signal similar to that shown in FIG. 6b. The envelope of this series of pulses for illustrative purposes, could be represented by a complex signal composed of frequencies $$f_x = n f_r \pm \frac{\omega_c}{2\pi}$$

$n = \pm 0, 1, 2, 3 \ldots$ and $$f_y = n f_r \pm \frac{\omega_T}{2\pi}$$

$n = \pm 0, 1, 2, 3 \ldots$ together with their associated sidebands within the selected range of frequencies, i.e., 0 to $f_r/2$ cycles per second. This complex signal could then be represented by the dashed line 162 in the figure which could be resolved into a clutter return component 164 of 1000 cycles and a target echo component 166 of a frequency dependent on the Doppler shift and the amount by which the reference signal is shifted from the coherent oscillator frequency. It is evident that the composite spectral distribution for the series of pulses with the envelope 162 can be approximated from the separate components 164 and 166. The composite spectral distribution for component 164 is, of course, the same as the spectral distributions 142 received when no echo signal was present where the spectral distributions 142 are spaced at odd multiples of $f_r/4$ in the manner previously described. The component 166, on the other hand, is indicative of the portion of the received signal previously designated as the target echo signal. This component 168 will have a fundamental frequency determined as described above and, in addition, will be amplitude modulated in accordance with the spin frequency of the antenna. In general, there will be very little noise on this signal so that its individual spectral distributions 168 will comprise a carrier frequency component 170 with side-band components 172 representing the modulations, as shown in FIG. 6c. The side-band components 172 will be spaced from the center frequency component 170 by an interval equal to the spin frequency of the antenna 10.

After passing through the low pass filter 82, only the particular spectral distributions that were within the range of frequencies from zero to $f_r/2$ cycles per second will remain, as shown in FIG. 6d. The clutter reject filter 98 is now used to reject the remaining spectral distribution 142 of the clutter return signal and leave only the spectral distribution 168 of the target echo signal, as shown in FIG. 6e. The clutter reject filter 98 is of the band-elimination type which has a reject band that is centered about $f_r/4$ cycles per second and is coextensive with the range of frequencies of the spectral distribution 142 of the clutter return signal. Thus, the spectral distribution of the signal appearing at the output of clutter reject filter 98 is the spectral distribution 168 wherefor the associated signal is essentially the component 166 shown in FIG. 6b. As previously specified, the component 166 is composed of a carrier represented by the fundamental frequency component 170 and the side-band components 172 which are amplitude-modulations of the carrier at the spin frequency. This signal at the output of filter 98 is then demodulated by the AM detector 100 thereby to convert the side-band components 172 into the error signal which is employed for maintaining the antenna 10 directed towards the target in the manner previously described.

What is claimed is:

1. In a moving target indicating system of the character described wherein a signal containing both target echo and clutter return components is received in response to exploratory pulses radiated from an antenna tracking a target and mixed with local oscillations from a stable oscillator to provide a composite intermediate-frequency signal; apparatus comprising means for producing a reference signal of a frequency that has a predetermined relationship to the frequency of the intermediate-frequency signal, gating means responsive to said intermediate-frequency signal for selecting a range element from each sweep thereof that includes the target echo component, means for adding the portion of said intermediate-frequency signal within the selected range element vectorially to said reference signal to produce a resultant signal, means responsive to said reference and resultant signals for producing a video signal constituting a series of pulses concurrent in time with said range elements and of amplitudes proportional to successive phase differences between said reference and resultant signals, and means responsive to said video signal for producing an error signal representative of the average angular deviation of the direction of maximum radiation of the antenna from said target.

2. The combination defined in claim 1 wherein said means for producing said reference signal produces said reference signal at an amplitude sufficiently large relative to that of said intermediate-frequency signal to maintain the maximum phase difference between said reference and resultant signals less than 15°, whereby the respective amplitudes of said series of pulses are substantially linearly proportional to said successive phase differences.

3. The combination defined in claim 1 wherein the exploratory pulses are periodically radiated at a predetermined pulse-repetition frequency, and said means responsive to said video signal for producing an error signal comprises a filter responsive to said video signal having a pass band disposed between two successive integral multiples of one-half the pulse-repetition frequency, whereby individual spectral distributions of said target echo and said clutter return components of said received signal are isolated, means including a frequency discriminator tuned to produce a null output at the center frequency of said pass band and responsive to the clutter return components for shifting the frequency of said reference signal in a manner to shift the individual spectral distribution of clutter return components to said center frequency, band-elimination means coupled to the output of said filter having a reject band about said center frequency and coextensive with said spectral distribution of clutter return components for isolating the target echo components, and means coupled to said band-elimination means for demodulating said target echo components, thereby to produce the error signal.

4. The combination defined in claim 3 wherein the pass band of said filter responsive to said video signal extends from zero cycles per second to one-half the pulse repetition frequency.

5. In a moving target indicating system of the character described wherein it is desired to continuously orient a conically scanning antenna so as to direct successive exploratory pulses radiated therefrom in a circular path about a target under conditions where target echo and clutter return signals are simultaneously received in response to exploratory pulses radiated from the antenna; apparatus comprising a stable oscillator for providing local oscillations, a mixer responsive to the received signals and said local oscillations for producing an intermediate-frequency signal, gating means coupled to said mixer for selecting a range element including the target echo signal from each sweep of said intermediate-frequency signal, means responsive to the exploratory pulses and said local oscillations for producing a reference signal of a frequency having a predetermined relationship with respect to the frequency of said clutter return signal, means responsive to said intermediate-frequency signal during range element intervals and said reference signal for vectorially adding said intermediate-frequency signal to said reference signal to produce a resultant signal having a phase deviation from said reference signal proportional to the component of said intermediate-frequency signal in quadrature with said reference signal, a phase detector responsive to said resultant and reference signals for producing output potentials proportional to successive phase deviations therebetween, thereby producing a video signal constituted of a series of pulses concurrent in time with said range elements and of amplitudes corresponding to said successive phase deviations, and means responsive to said video signal for producing an error signal representative of the error in the orientation of said antenna.

6. In a moving target indicating system of the character described wherein it is desired to track a target with an antenna under conditions where target echo and clutter return signals are simultaneously received in response to exploratory pulses periodically radiated from the antenna at a predetermined pulse-repetition frequency, said system having a stable oscillator for providing local oscillations, a mixer responsive to the received signals and said local oscillations for producing an intermediate-frequency signal, and means coupled to said mixer for selecting a range element including the target echo signal from each sweep of said intermediate-frequency signal; apparatus comprising: means responsive to the exploratory pulses and said local oscillations and including a reactance tube for producing a reference signal of a frequency having a predetermined relationship with respect to the frequency of said clutter return signal, means coupled to the gating means and responsive to said reference signal for vectorially adding said intermediate-frequency signal during the range element intervals to said reference signal to produce a resultant signal having a phase deviation from said reference signal proportional to the component of said intermediate-frequency signal in quadrature with said reference signal, means responsive to said resultant and reference signals and including a phase detector for producing a video signal constituted of a series of pulses concurrent in time with said range elements and of amplitudes corresponding to successive phase deviations between said resultant and reference signals, a filter coupled to said phase detector having a pass band disposed between two successive integral multiples of one-half the pulse-repetition frequency for isolating individual spectral distributions of components of said clutter return and target echo signals, frequency discriminator means responsive to only the spectral distribution of components of said clutter return signal for producing a null output at the center frequency of said pass band, said null output being impressed on said reactance tube to maintain said individual spectral distribution of components of said clutter return signal centered about said center frequency, band-elimination means coupled to said filter for rejecting the band of frequencies disposed about said center frequency coextensive with the individual spectral distribution of components of said clutter return signal, thereby to isolate the components of said target echo signal, and means coupled to said band-elimination means for demodulating said target echo signal to produce an error signal representative of the angular deviation of said antenna from said target.

7. In a moving target indicating system of the character described wherein a signal containing both target echo and clutter return components is received in response to exploratory pulses radiated at a predetermined pulse-repetition frequency from an antenna tracking a target and mixed with local oscillations from a stable oscillator to provide a composite intermediate-frequency signal; apparatus comprising means for producing a reference signal of a frequency substantially equal to that of said stable oscillator and capable of being shifted, means for vectorially adding said intermediate-frequency signal to said reference signal to produce a resultant signal, means for generating a video signal of an amplitude representative of the phase difference between said reference and resultant signals, means for taking a sequence of samples from said video signal which include intervals concurrent in time with corresponding range elements from each sweep of said intermediate-frequency signal which are near but do not include the target echo component, a first filter responsive to said sequence of samples taken from said video signal and having a pass band from $n$ to $(n+1)$ times one-half the predetermined pulse-repetition frequency of said exploratory pulses wherein $n=0, 1, 2, 3, 4 \ldots$, and means including a frequency discriminator coupled to the output of said first filter and having a null output at the mid-frequency of said pass band thereof for shifting the frequency of said reference signal to maintain the spectral distribution of the frequency components of said clutter return component disposed about said mid-frequency of said pass band.

8. The combination defined in claim 7 which additionally includes means for interposing a second filter between said first filter and said means including a frequency discriminator, said second filter having a pass band coextensive with said spectral distribution of frequency components of said clutter return signal, means for changing said sequence of samples to include the target echo component, a third filter coupled to said first filter for rejecting said frequency components of said clutter return signal, and means coupled to said third filter and responsive to said target echo component for producing a signal representative of the deviation of the antenna from said target.

References Cited

UNITED STATES PATENTS

| | | | |
|---|---|---|---|
| 2,776,426 | 1/1957 | Altman | 343—7.7 X |
| 2,991,467 | 7/1961 | Clarke | 343—7.3 X |
| 3,008,138 | 11/1961 | Berger et al. | 343—7.3 X |

RODNEY D. BENNETT, Primary Examiner

T. H. TUBBESING, Assistant Examiner

U.S. Cl. X.R.

343—7.7